United States Patent [19]
Akada

[11] Patent Number: 5,812,330
[45] Date of Patent: Sep. 22, 1998

[54] OPTICAL APPARATUS

[75] Inventor: Hiroshi Akada, Kanagawa-ken, Japan

[73] Assignee: Canon Kabushiki Kaisha, Tokyo, Japan

[21] Appl. No.: 823,811

[22] Filed: Mar. 24, 1997

Related U.S. Application Data

[62] Division of Ser. No. 577,235, Dec. 22, 1995, Pat. No. 5,644,440.

[30] Foreign Application Priority Data

Dec. 27, 1994 [JP] Japan .......................... HEI 06-325250

[51] Int. Cl.$^6$ ..................................................... G02B 7/02
[52] U.S. Cl. .......................... 359/823; 359/824; 359/814; 359/698; 324/207.21
[58] Field of Search ..................................... 359/823, 824, 359/814, 694, 696, 698; 250/201.2, 201.4; 324/207.21, 207.24

[56] References Cited

U.S. PATENT DOCUMENTS

| 5,430,375 | 7/1995 | Inoue et al. | 324/207.21 |
|---|---|---|---|
| 5,432,639 | 7/1995 | Sakamoto | 359/823 |
| 5,572,372 | 11/1996 | Sekine et al. | 359/824 |
| 5,587,846 | 12/1996 | Miyano et al. | 359/824 |
| 5,638,222 | 6/1997 | Shigehara | 359/814 |

*Primary Examiner*—Loha Ben
*Attorney, Agent, or Firm*—Robin, Blecker & Daley

[57] ABSTRACT

An optical apparatus comprises a guide member, an optical member capable of moving while being guided by the guide member, a vibration member held by the optical member and having a contact portion placed in contact with the guide member, the optical member being capable of being moved by a vibration produced by the vibration member, and a spring for pressing the vibration member against the guide member, the spring being held by the optical member, wherein the optical member is pressed against the guide member by a reaction force of the spring.

17 Claims, 7 Drawing Sheets

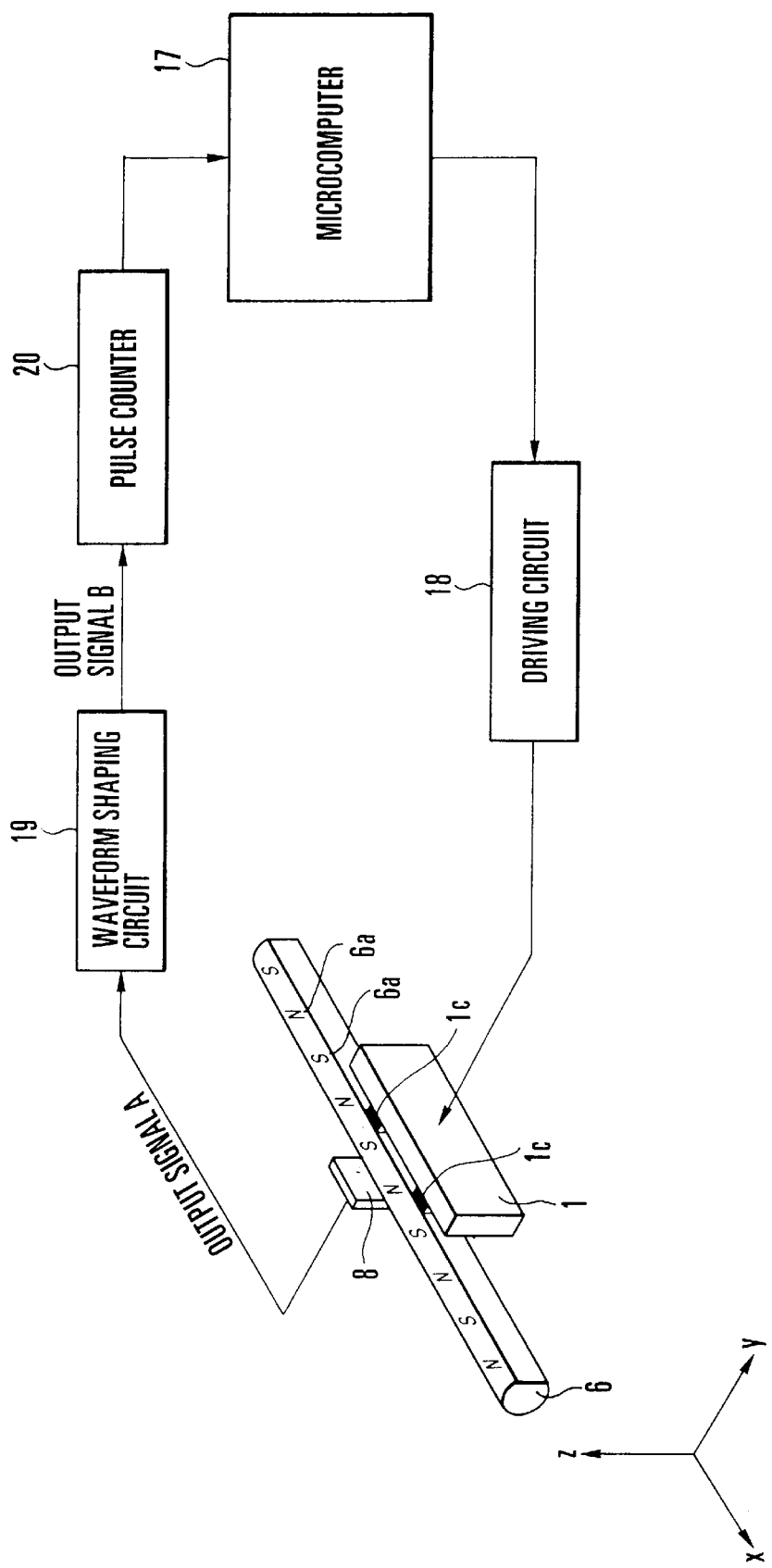

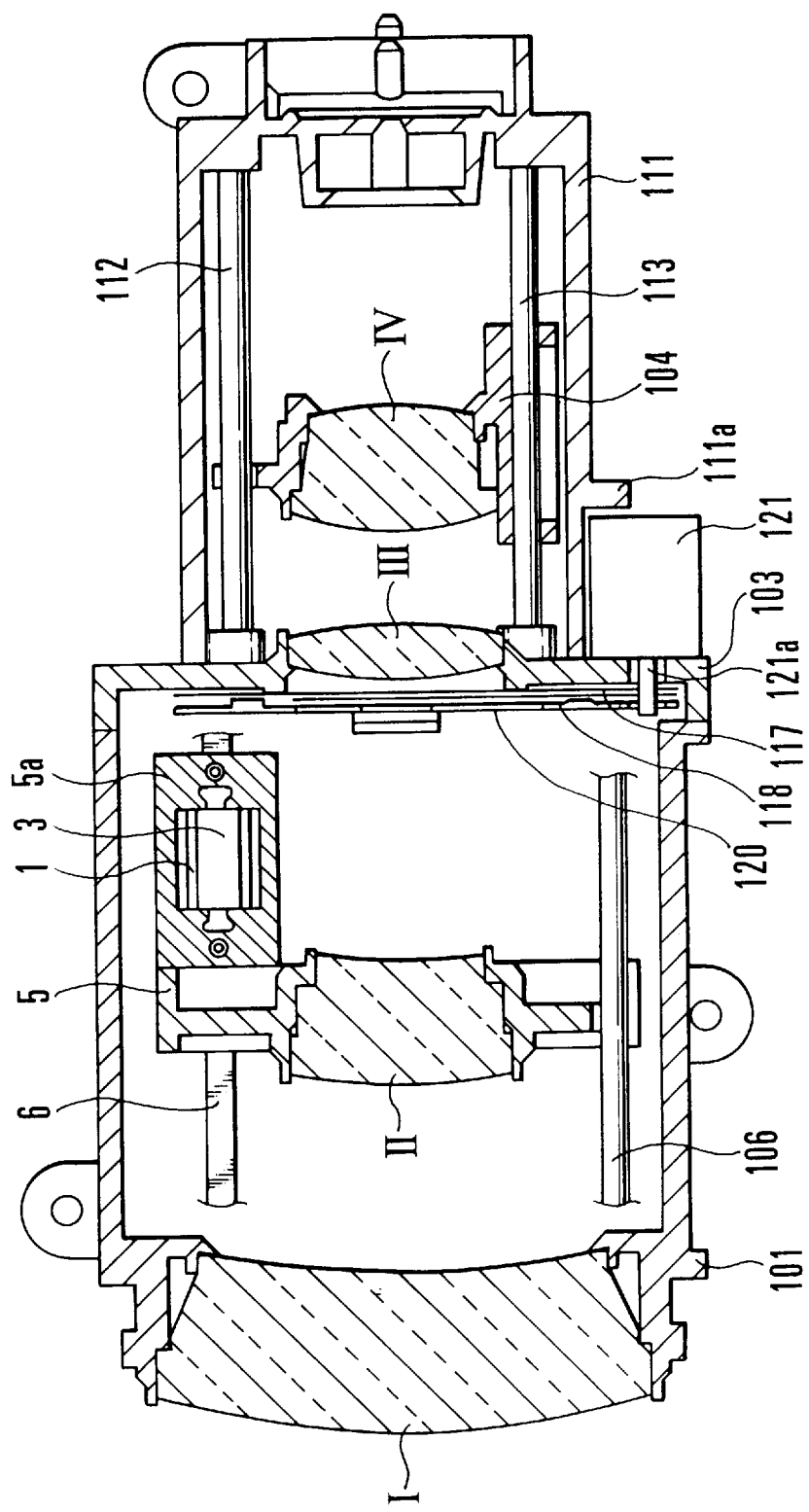

OPTICAL APPARATUS

This application is a division of application Ser. No. 08/577,235, filed Dec. 22, 1995 now U.S. Pat. No. 5,644,440.

BACKGROUND OF THE INVENTION

1. Field of the Invention

The present invention relates to an optical apparatus arranged to move an optical member, such as a lens.

2. Description of the Related Art

The optical apparatus shown in FIGS. 6 and 7 includes a first lens holding member 101 which holds a first lens group I, a second lens holding member 102 which holds a second lens group II, a third lens holding member 103 which holds a third lens group III, and a fourth lens holding member 104 which holds a fourth lens group IV. The first lens group I and the third lens group III are fixed lens groups, the second lens group II is a moving lens group for performing a zooming action, and the fourth lens group IV is a moving lens group for performing a focusing action. The second lens holding member 102 is held for sliding movement along the optical axis by guide levers 105 and 106 each of which is supported at one end by the first lens holding member 101 and at the other end by the third lens holding member 103. A rack member 107 supported by the second lens holding member 102 meshes with a screw shaft 108a of an arc-shaped zooming motor 108 fixed to the third lens holding member 103, so that the second lens holding member 102 moves along the optical axis by the rotation of the screw shaft 108a of the zooming motor 108. The forward end of the screw shaft 108a is rotatably supported by a bearing 109 which is provided on the first lens holding member 101.

The first lens holding member 101 has an opening 101a which is covered with a cover 110. The opening 101a is provided for aiding in incorporating the screw shaft 108a into the first lens holding member 101 to mesh the screw shaft 108a with the rack member 107 and for allowing a visual inspection of the inside of the first lens holding member 101. The fourth lens holding member 104 is supported for movement along the optical axis by second guide bars 112 and 113 each of which is supported at one end by the third lens holding member 103 and at the other end by a rear fixed lens barrel 111 having an image-pickup-element mounting part 111b.

Referring to FIG. 7, a rack member 114 supported by the fourth lens holding member 104 meshes with a screw shaft 115a of an arc-shaped focusing motor 115 fixed to the rear fixed lens barrel 111. The fourth lens holding member 104 moves along the optical axis by the rotation of the focusing motor 115. Similarly to the screw shaft 108a of the zooming motor 108, the forward end of the screw shaft 115a is rotatably supported by a bearing (not shown) provided on the rear fixed lens barrel 111, and an opening (not shown) for aiding in performing incorporating work and visual inspection, which is provided in the rear fixed lens barrel 111, is covered with a cover 116.

The arrangement shown in FIGS. 6 and 7 also includes iris blades 117 and 118, and an ND filter 119 (not shown in FIG. 6) is attached to the iris blade 118. The iris blades 117 and 118 are retained between a blade pressure plate 120 and the third lens holding member 103, and are driven by the swinging motion of a driving arm 121a of an arc-shaped iris driving part 121.

However, the above-described example involves a lowering in space factor and increases the size of a lens driving device, because it is necessary to use rotating motors, such as stepping motors, and transmission members, such as rack members, for converting the rotational motions of the corresponding rotating motors into rectilinear motions.

Another consideration is that such a rack member or the like may come off on account of an accident such as a fall or a shock to disable the movement of a lens holding member.

As described above, the lens holding member normally has a single guide hole and a single guide groove, and is capable of moving along the optical axis by means of two guide members one of which is inserted through the single guide hole and the other of which is fitted in the single guide groove. Yet another consideration is, therefore, that since a play is normally present between either of the guide members and the guide hole or the guide groove, the eccentricity or the like of the lead screw shaft of a motor may disable the lens holding member from moving along the optical axis with high precision and may also cause an image-waver phenomenon or the like.

The arrangement of a position detecting part of a movable lens holding member of the type described in Japanese Laid-Open Patent Application No. Hei 3-251830, Hei 4-93907 or the like is such that the movable lens holding member is connected to a potentiometer or the like disposed outside a lens barrel by a connecting member. Yet another consideration is, therefore, that highly precise position detection may not be performed owing to a play between a lens frame and a guide pole fitted into the lens frame and a play between the lens frame and the connecting member which connects the lens frame to a detector such as the potentiometer.

A further consideration is that, in the case of the arrangement of the position detector described in Japanese Laid-Open Patent Application No. Hei 5-328696 or the like, the gap between a position detecting magnet and a detector may not be maintained at a constant distance owing to a play between a moving element and a guide shaft and highly precise position detection may not be performed.

SUMMARY OF THE INVENTION

It is, therefore, an object of the present invention to provide an optical apparatus which comprises a guide member, an optical member capable of moving while being guided by the guide member, a vibration member capable of moving the optical member by means of a driving vibration, and a spring for pressing the vibration member against the guide member, the spring being held by the optical member, wherein a play is absorbed by the spring force of the spring.

The above and other objects, features and advantages of the present invention will become apparent from the following detailed description of a preferred embodiment of the present invention, taken in conjunction with the accompanying drawings.

BRIEF DESCRIPTION OF THE DRAWINGS

FIG. 3 is a block diagram showing the actuating circuit of the lens driving device shown in FIG. 1;

FIG. 5 is a cross-sectional view of a lens barrel in which the lens driving device according to the embodiment of the present invention is incorporated;

DETAILED DESCRIPTION OF THE PREFERRED EMBODIMENT

Figure 1:
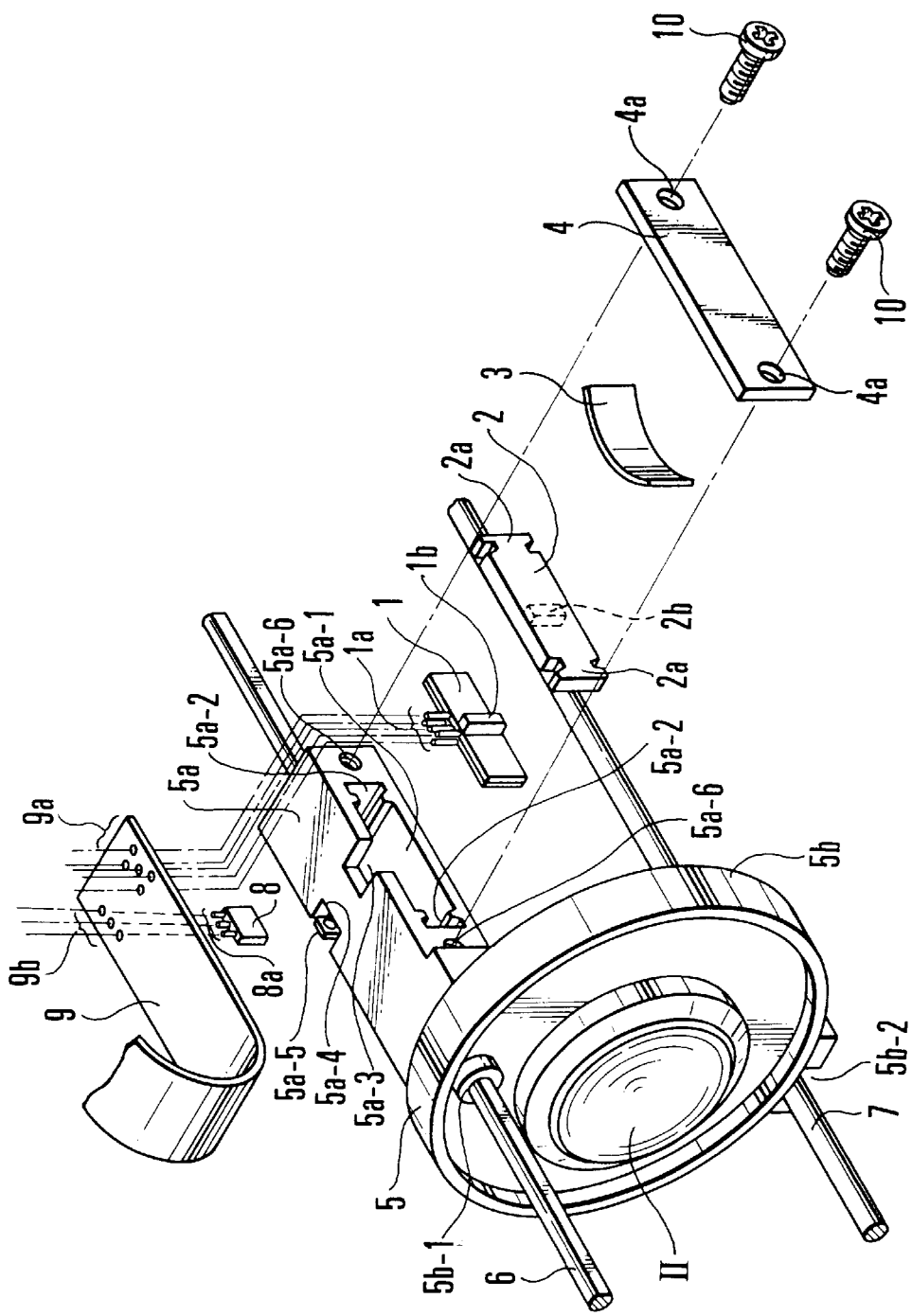
FIG. 1 is a diagrammatic exploded perspective view showing a lens driving device according to an embodiment of the present invention.

FIG. 1 diagrammatically shows a lens driving device according to an embodiment of the present invention.

Referring to FIG. 1, a piezoelectric vibration member 1 which serves as a vibration member includes a metallic thin sheet of brass, phosphor bronze or the like and two piezo-electric elements made of lead zirconate titanate (hereinafter referred to as PZT), and the metallic thin sheet is sandwiched between the two piezoelectric elements. When an alternating voltage of high frequency (ultrasonic frequency band) is applied to a terminal group 1a, mass points (loops) at each of which an elliptical motion is formed and a mass point (node) at which no substantial vibration occurs are produced in the piezoelectric vibration member 1. A pair of driving pieces 1c formed from a frictional material (refer to FIGS. 2(a) and 2(b)) are provided on the mass points at each of which an elliptical motion is formed, while a fixed member 1b is provided on the mass point at which no substantial vibration occurs.

Figure 2A:
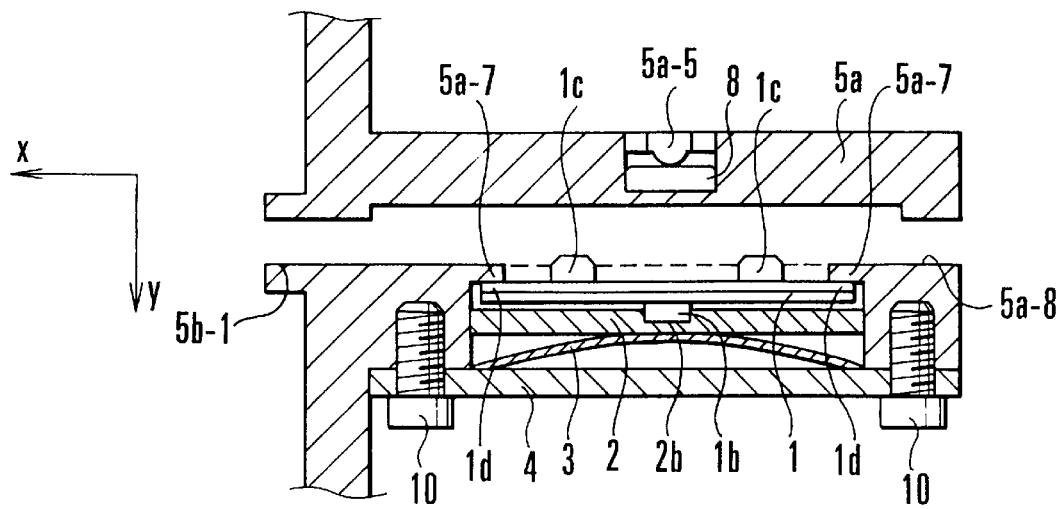
FIGS. 2(a) and 2(b) are diagrammatic cross-sectional views showing the state of mounting of the oscillator and the lens holding member shown in FIG. 1.
Figure 2B:
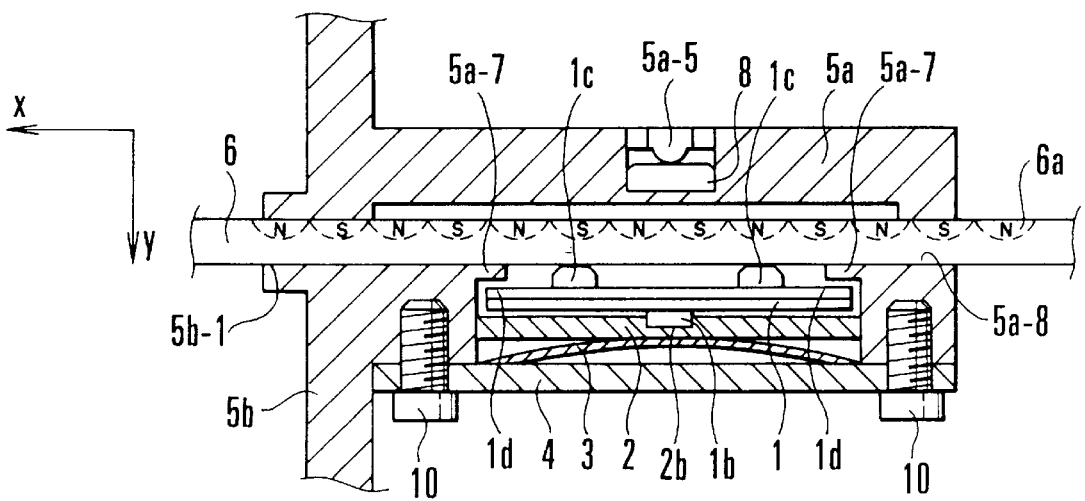

In the piezoelectric vibration member 1, each of the two piezoelectric elements has opposite faces on which electrode faces are respectively formed, as by evaporation, and is fixed to the metallic thin sheet which has a grounding electrode function, by using an adhesive. The driving principle of the piezoelectric vibration member 1 is such that the pair of driving pieces 1c of the piezoelectric vibration member 1, which are formed from a frictional material, is made to perform a elliptical motion in an X-Y plane as shown in FIG. 2(a), by a combination of vibrations of two modes, one of which is a bending vibration mode for exciting standing waves in the piezoelectric vibration member 1 in the longitudinal direction thereof and the other of which is a longitudinal vibration mode for causing the piezoelectric vibration member 1 to expand and contract in the longitudinal direction thereof. As shown in FIG. 2(b), the pair of driving pieces 1c are maintained in pressure contact with a guide member 6 (to be described later) which extends along the optical axis and also serves as a stator, and the piezoelectric vibration member 1 rectilinearly moves along the guide member 6 owing to the frictional driving force produced between the pair of driving pieces 1c and the guide member 6.

The terminal group 1a of the piezoelectric vibration member 1 includes five terminals. One of the five terminals is a grounding electrode, and the other four terminals are used for applying a frequency voltage of predetermined phase to the piezoelectric vibration member 1 to excite a vibration of either of the aforesaid two modes, or two of the four terminals are used for detecting the state of vibration.

A slide member 2 is formed from a resin or the like and has slide portions 2a which slidably engages with a movable lens holding member 5 which will be described later and a vertical groove 2b which is fitted onto the fixed member 1b formed in the lengthwise middle of the piezoelectric vibration member 1. A leaf spring 3 is made of phosphor bronze or the like, and serves the role of pressing the piezoelectric vibration member 1 against the guide member 6. A lid 4 is made from a resin or copper plate and has fastening holes 4a.

The movable lens holding member 5, which is made of resin or the like, has a sleeve portion 5a which is provided with a hole portion 5a-1 into which to accommodate the piezoelectric vibration member 1, the slide member 2 and the leaf spring 3, slide hole portions 5a-2 for engagement with the respective slide portions 2a of the slide member 2, a hole portion 5a-3 into which to insert the terminal group 1a of the piezoelectric vibration member 1 with a play, a hole portion 5a-4 into which to fit a magnetic sensitive element 8 which will be described later, an elastic piece 5a-5 for clamping the magnetic sensitive element 8, and fastening screw holes 5a-6. As shown in FIGS. 2(a) and 2(b), the sleeve portion 5a also has stoppers 5a-7 for limiting the movement of the piezoelectric vibration member 1 and a hole 5a-8 through which to insert the guide member 6. A lens frame 5b has a hole 5b-1 and a U-shaped groove 5b-2 into which to respectively fit the guide member 6 and a guide member 7 which will be described later. The second lens group II is fixed to the lens frame 5b by a known method such as caulking. The guide member 6 is prepared by forming a magnetic material into a bar-like shape, and is machined to have a D-like shape in cross section. The guide member 6 is magnetized in a direction (y direction) perpendicular to the direction of the optical axis (x direction), as shown at 6a, in such a manner that its polarity alternates with a constant pitch in the direction of the optical axis (x direction). The guide member 7 is made of stainless steel or the like which is used for ordinary lens driving devices. The magnetic sensitive element 8, which is an MR element, a Hall element or the like, has a terminal group 8a. A flexible printed circuit board 9 has holes 9a and 9b through which to respectively insert the terminal group 1a of the piezoelectric vibration member 1 and the terminal group 8a of the magnetic sensitive element 8.

The correlations between the individual members noted above will be described below.

The fixed member 1b of the piezoelectric vibration member 1 is fitted into the vertical groove 2b of the slide member 2. At this time, a small distance occurs between the face of the piezoelectric vibration member 1 which has the fixed member 1b and the face of the slide member 2 which has the vertical groove 2b. That is to say, the piezoelectric vibration member 1 and the slide member 2 are placed in contact with each other through only the inner faces of the vertical groove 2b.

The slide member 2 with the piezoelectric vibration member 1 is inserted into the hole portion 5a-1 of the sleeve portion 5a of the movable lens holding member 5. At this time, since the slide portions 2a of the slide member 2 are inserted into the respective slide hole portions 5a-2 of the movable lens holding member 5, the movements of the slide member 2 in the x- and z-axis directions are limited, while the movement of the slide member 2 in the y-axis direction is allowed.

When the slide member 2 is slid in the −y direction, the opposite end portions 1d shown in FIG. 2(a) of the piezoelectric vibration member 1 are made to abut against the respective stoppers 5a-7 of the sleeve portion 5a and the slide member 2 stops. At this time, the pair of driving pieces 1c of the piezoelectric vibration member 1 project from the hole 5b-1 or the hole 5a-8 in the -y direction to a small extent. Each of the driving pieces 1c has chamfered edges so as to facilitate insertion of the guide member 6. The leaf spring 3 is inserted into the hole portion 5a-1, and the bent portion of the leaf spring 3 is brought into contact with an approximately central portion of the slide member 2. The lid 4 is attached to the sleeve portion 5a and is fixed against a load due to the flexure of the leaf spring 3 by screwing fastening members 10 into the respective screw holes 5a-6 of the sleeve portion 5a.

As described above, the piezoelectric vibration member 1 stops when the opposite end portions 1d of the piezoelectric vibration member 1 come into abutment with the respective stoppers 5a-7. If the piezoelectric vibration member 1 is inserted to a position which allows the lid 4 to be fixed, the load due to the flexure of the leaf spring 3 works to press the opposite end portions 1d of the piezoelectric vibration member 1 against the respective stoppers 5a-7. The piezoelectric vibration member 1 and other associated elements, which constitute an ultrasonic motor which is a lens driving source, are accommodated in the sleeve portion 5a of the movable lens holding member 5 in the above-described manner, so that the piezoelectric vibration member 1 and other associated elements which constitute an ultrasonic motor can be held in the sleeve portion 5a even if the guide member 6 is not inserted which also serves as a rail-shaped stator which constitutes a linear ultrasonic motor.

The guide member 6 having a D-like cross section is inserted through the hole 5b-1 of the lens frame 5b and the hole 5a-8 of the sleeve portion 5a. Since the pair of driving pieces 1c of the piezoelectric vibration member 1 are pressed in the +y direction by the guide member 6, the opposite end portions 1d of the piezoelectric vibration member 1 are moved away from the stoppers 5a-7 of the sleeve portion 5a and only the pair of driving pieces 1c press the straight cut portion of the D-like cross section of the guide member 6 (refer to FIG. 2(b)). The guide member 7 is fitted into the U-shaped groove 5b-2 of the lens frame 5b by an ordinary method. The magnetic sensitive element 8 which is an MR element, a Hall element or the like is fitted into the hole portion 5a-4. At this time, the magnetic sensitive element 8 is located in the vicinity of the guide member 6 at a position opposite to the ultrasonic motor by being clamped by the elastic piece 5a-5 provided on the sleeve portion 5a. The terminal group 1a of the piezoelectric vibration member 1 and the terminal group 8a of the magnetic sensitive element 8 are respectively inserted through the holes 9a and 9b formed in the flexible printed circuit board 9, and both terminal groups 1a and 8a are fixed by a known method such as soldering. The flexible printed circuit board 9 is of a length having room for allowing the movable lens holding member 5 to move in the x-axis direction, and has the shape of a U-turn as shown in FIG. 1.

An actuating circuit for carrying out the operation of the lens driving device according to the present embodiment will be described below with reference to the block diagram shown in FIG. 3.

Figures 4A, 4B:
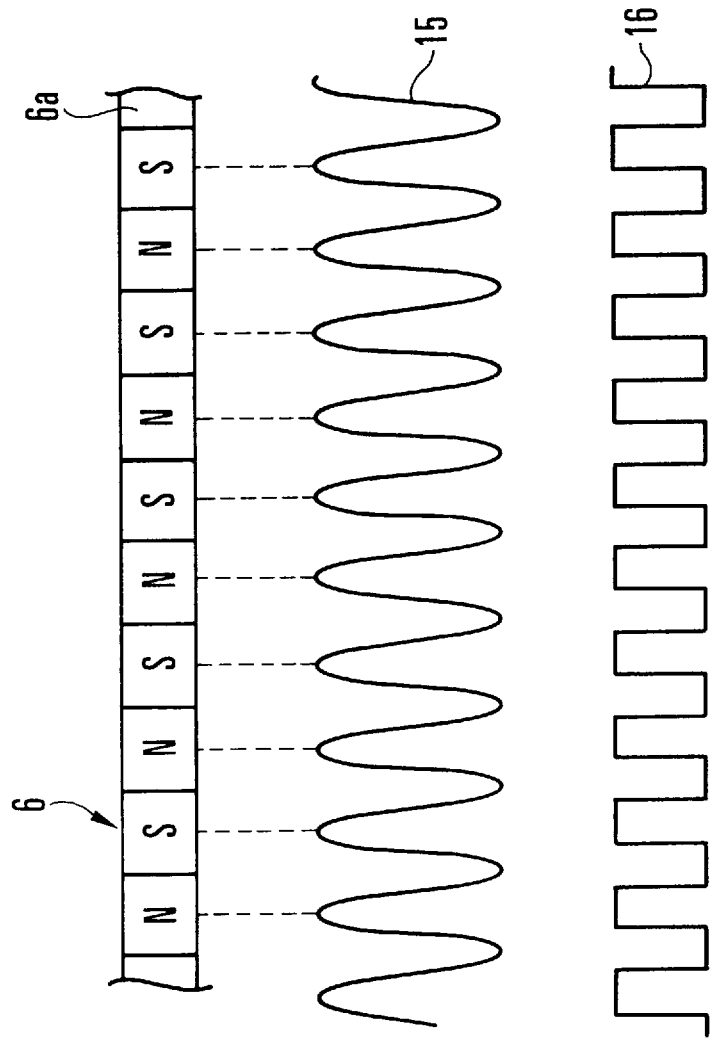
FIGS. 4(a) and 4(b) are waveform charts of the input and output signals of the waveform shaping circuit provided in the actuating circuit shown in FIG. 3.

A control signal transmitted from a microcomputer 17 is inputted to a driving circuit 18 for driving the ultrasonic motor, and when an output signal from the driving circuit 18 is supplied to the piezoelectric vibration member 1 as a high-frequency voltage, the surface of each of the driving pieces 1c which is maintained in contact with the guide member 6 makes an elliptical motion so that the piezoelectric vibration member 1 moves in the x-axis direction. During the movement of the piezoelectric vibration member 1, the magnetic sensitive element 8 is affected by the magnetic field of the guide member 6 to output the alternating waveform 15 shown in FIG. 4(a) (output signal A). The output signal A is inputted to a waveform shaping circuit 19, which outputs the waveform 16 shown in FIG. 4(b) (output signal B). The output signal B is inputted to a pulse counter 20, which outputs information indicative of a count value to a microcomputer 17. The microcomputer 17 recognizes the position of the piezoelectric vibration member 1 on the basis of the count value, and inputs the next control signal to the driving circuit 18 via various control circuits.

The above-described embodiment provides the following effects and advantages.

Since the ultrasonic motor which is a driving source for driving the movable lens holding member 5 is disposed in the sleeve portion 5a of the movable lens holding member 5, unlike the conventional example, it is not necessary to incorporate a rotating motor nor a rack member which is a transmission member for converting the rotational motion of the rotating motor into a rectilinear motion. Accordingly, it is possible to improve the space factor of the lens driving device, whereby the entire size thereof can be reduced.

Figure 6:
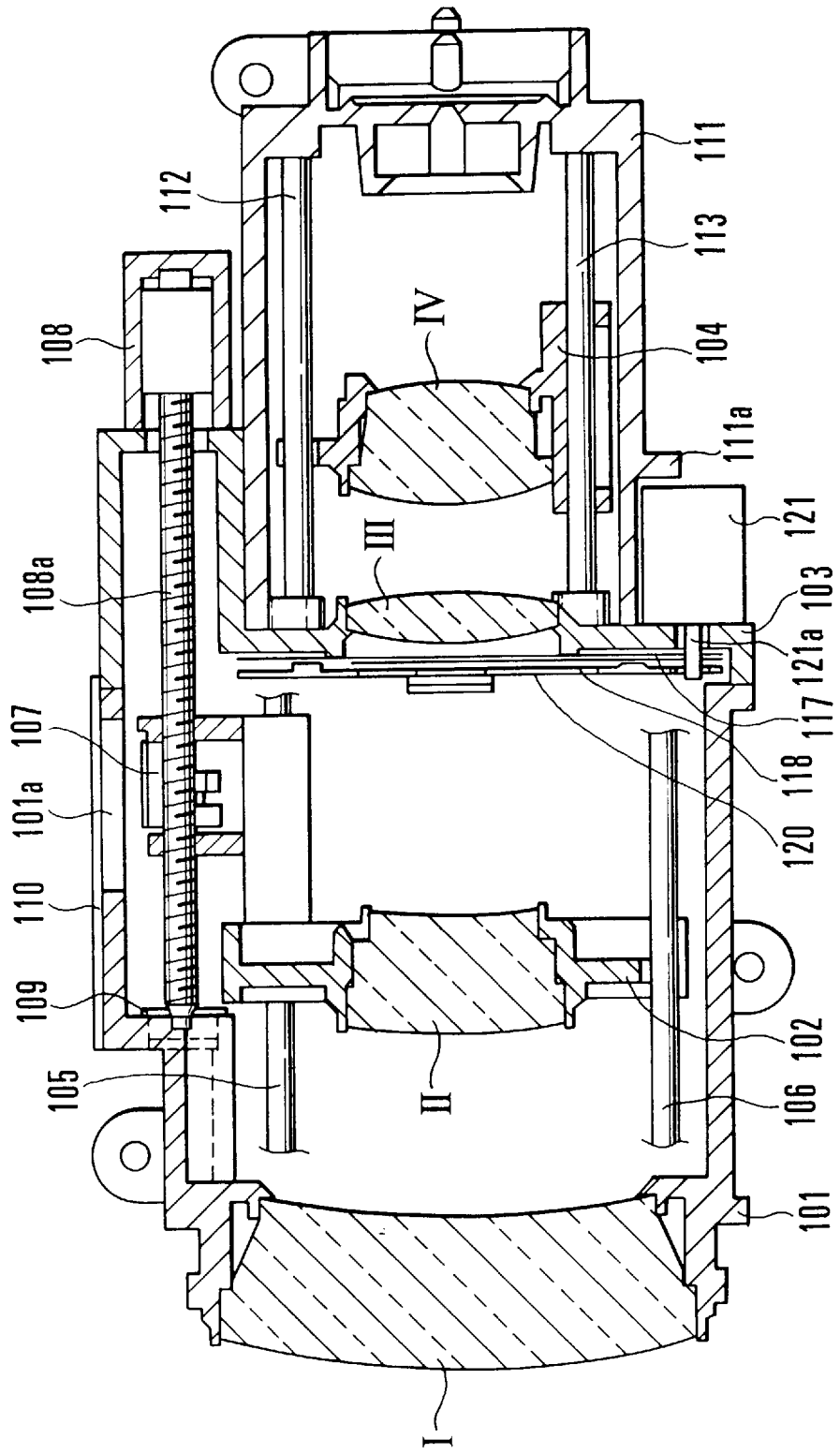
FIG. 6 is a cross-sectional view showing a lens barrel having a conventional lens driving device.
Figure 7:
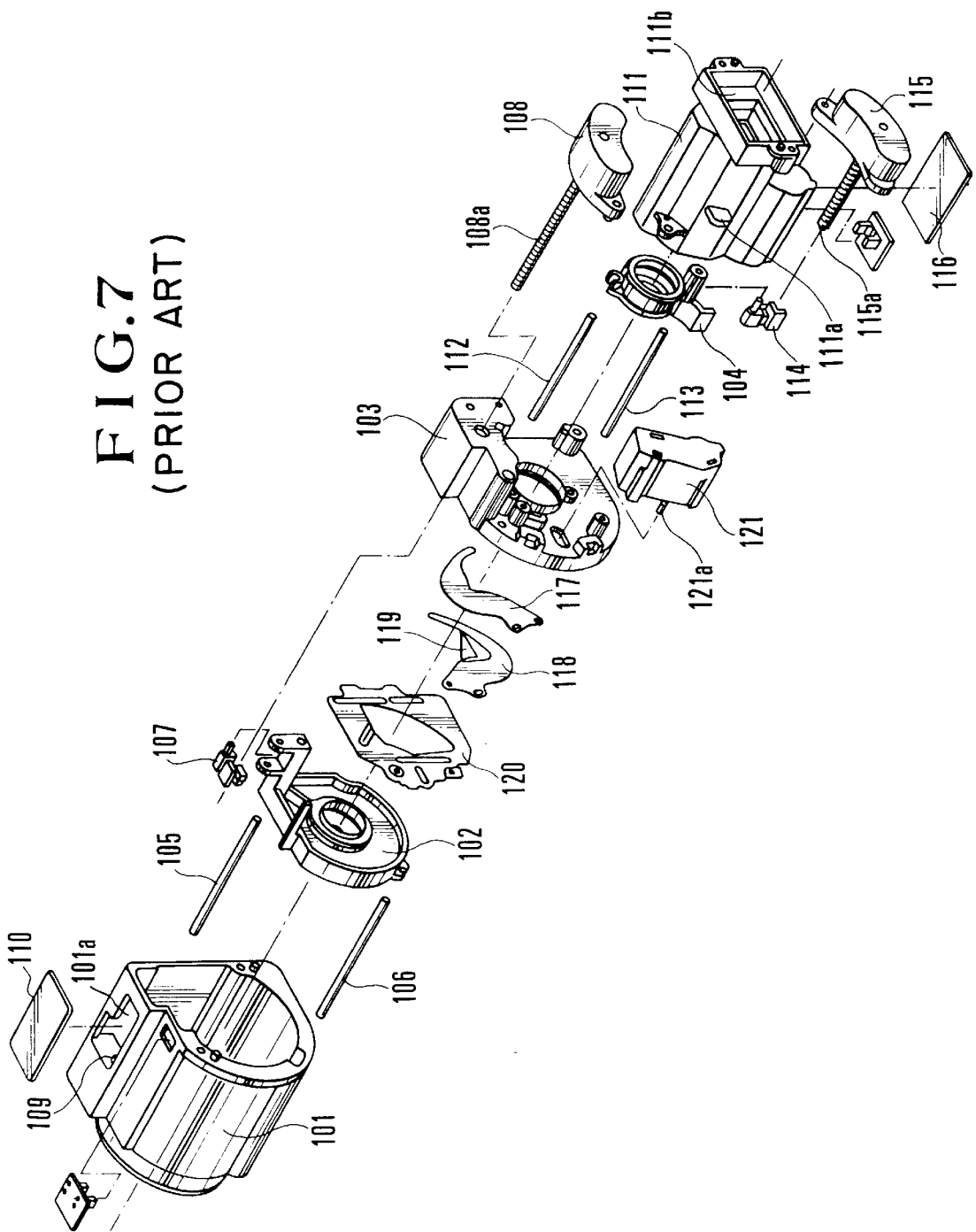
FIG. 7 is a diagrammatic exploded perspective view of the lens driving device shown in FIG. 6.

FIG. 5 is a cross-sectional view of a lens barrel in which the lens driving device according to the embodiment of the present invention is incorporated. In FIG. 5, identical reference numerals are used to denote constituent elements common to those shown in FIGS. 1 and 6, and the description thereof is omitted for the sake of clarity. It is apparent that the lens barrel shown in FIG. 5 can be made smaller in size than the conventional lens barrel shown in FIG. 6. In addition, the present embodiment can also solve the problem that a rack member may come off on account of an accident such as a fall or a shock.

Since the leaf spring 3 present in the ultrasonic motor presses the piezoelectric vibration member 1 as well as the guide member 6, it is possible to move the movable lens holding member 5 while biasing it at all times. Accordingly, it is possible to solve the problem of an optical performance degradation, such as an image waver.

The magnetic sensitive element 8 for detecting the position of the movable lens holding member 5 is located in the sleeve portion 5a of the movable lens holding member 5 in the vicinity of the guide member 6 and at a position approximately opposite to the ultrasonic motor, and the guide member 6 is magnetized to have the predetermined polarity 6a. Accordingly, the distance between the guide member 6 and the magnetic sensitive element 8 which is accommodated in the movable lens holding member 5 in the state of being biased with respect to the guide member 6 by the leaf spring 3 of the ultrasonic motor can be kept uniform without being influenced by a play, so that high-precision position detection is enabled.

According to the above-described embodiment, by exciting a vibration of a vibration member, the vibration member can directly move a lens holding member along the optical axis. The vibration member has only to be brought into pressure contact with a stator and, in addition, can be formed into a rectangular, flat thin shape. In addition, unlike the conventional example, it is not necessary to use a rack member which is a transmission member for converting the rotational motion of a motor into a rectilinear motion. Accordingly, it is possible to improve the space factor, so that the entire size of a lens driving device can be reduced to minimize a lens barrel.

In addition, an exclusive member with which the vibration member is maintained in pressure contact or a member present in the lens barrel can be used as a stator.

In addition, even if a shock due to a fall or the like is applied, it is possible to prevent the conventional problem that a rack member comes off. Accordingly, it is possible to improve the quality of the lens driving device.

In addition, according to the above-described embodiment, since a guide member is used as the stator and the lens holding member is at all times elastically urged in a direction perpendicular to the optical axis with respect to the guide member via the vibration member, it is possible to prevent a play from occurring between the lens holding member and the guide member, so that the lens holding member can be moved along the optical axis with high precision. In particular, since driving due to the excited vibration of the vibration member enables high-precision positioning, it is possible to drive the lens holding member with high precision as a whole.

In addition, according to the above-described embodiment, in magnetically detecting the position of a lens and positioning the lens by feedback control, since the lens holding member and the guide member are held in a biased state by the elastic force of an elastic member which presses the vibration member, the gap between a magnetic pole portion and a detecting portion can be kept constant and the precision of detection can be improved, whereby the precision of lens position control can be made far higher.

In addition, according to the above-described embodiment, the detecting portion, which is opposed to the vibration member, is present at the position where the pressure of the elastic member to press the vibration member works on the guide member most strongly, whereby the gap between the detecting portion and the guide member can be kept far more constant and the precision of detection can be improved to a further extent. Accordingly, it is possible to improve the precision of lens driving to a further extent.

Although in the above-described embodiment the vibration member is maintained in pressure contact with the guide member which is fixed, it is also possible to realize an arrangement in which the vibration member is brought into pressure contact with a fixed member other than the guide member.

What is claimed is:

1. An optical apparatus comprising:
    a guide member divided in a predetermined pattern along a guiding direction;
    an optical member capable of moving while being guided by said guide member;
    a driving device for moving said optical member and movable with said optical member; and
    a detecting element held by said optical member and capable of detecting said predetermined pattern of said guide member and detecting an amount of movement of said optical member.

2. An optical apparatus according to claim 1, wherein said guide member has a bar-like shape and guides said optical member to allow said optical member to move along an optical axis.

3. An optical apparatus according to claim 1, wherein said predetermined pattern of said guide member is a pattern of magnetic poles formed by magnetization, and said detecting element is a magnetic detecting element.

4. An optical apparatus according to claim 3, wherein said guide member has a bar-like shape and guides said optical member to allow said optical member to move along an optical axis.

5. An optical apparatus according to claim 3, wherein said detecting element outputs an alternating signal in accordance with a movement of said optical member.

6. An optical apparatus according to claim 3, wherein said magnetic detecting element is an MR element which detects a magnetic pole formed on said guide member.

7. An optical apparatus according to claim 1, further comprising a microcomputer for computing an amount of movement of said optical member on the basis of an output from said detecting element.

8. An optical apparatus according to claim 1, wherein said driving device comprises a vibration member held by said optical member and having a contact portion placed in contact with said guide member, said optical member being capable of being moved by a vibration produced by said vibration member.

9. An optical apparatus according to claim 8, further comprising a spring for pressing said vibration member against said guide member, said spring being held by said optical member, wherein said optical member is pressed against said guide member by a reaction force of said spring.

10. An optical apparatus according to claim 9, wherein said guide member has a bar-like shape and guides said optical member to allow said optical member to move along an optical axis.

11. An optical apparatus according to claim 10, wherein said detecting element is disposed opposite to said vibration member.

12. An optical apparatus according to claim 10, wherein said detecting element and said vibration member are disposed on opposite sides of said guide member.

13. An optical apparatus according to claim 1, wherein said driving device is a vibration wave actuator which moves between respective ends of said guide member by giving vibration to said guide member.

14. An optical apparatus comprising:
    a guide member divided in a predetermined pattern along a guiding direction;
    an optical member capable of moving while being guided by said guide member; and
    a driving device movable between respective ends of said guide member for moving said optical member; and
    a detecting element held by said optical member and capable of detecting said predetermined pattern of said guide member and detecting an amount of movement of said optical member.

15. An optical apparatus according to claim 14, wherein said driving device is a vibration wave actuator which moves between respective ends of said guide member by giving vibration to said guide member.

16. An optical apparatus according to claim 14, wherein said predetermined pattern of said guide member is a pattern of magnetic pole formed by magnetization, and said detecting element is a magnetic detecting element.

17. An optical apparatus according to claim 16, wherein said magnetic detecting element is an MR element which detects a magnetic pole formed on said guide member.

* * * * *